(12) United States Patent
Sekiguchi

(10) Patent No.: US 9,043,108 B2
(45) Date of Patent: May 26, 2015

(54) DRIVING SUPPORT APPARATUS FOR VEHICLE

(71) Applicant: FUJI JUKOGYO KABUSHIKI KAISHA, Tokyo (JP)

(72) Inventor: Hiroyuki Sekiguchi, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 42 days.

(21) Appl. No.: 13/833,782

(22) Filed: Mar. 15, 2013

(65) Prior Publication Data

US 2013/0261916 A1  Oct. 3, 2013

(30) Foreign Application Priority Data

Mar. 29, 2012 (JP) ................................. 2012-077036

(51) Int. Cl.

| G06F 7/70 | (2006.01) |
|---|---|
| B60Q 1/00 | (2006.01) |
| G01S 13/00 | (2006.01) |
| B60T 8/17 | (2006.01) |
| B60T 7/12 | (2006.01) |
| B60T 7/22 | (2006.01) |
| B60W 10/184 | (2012.01) |
| B60W 30/095 | (2012.01) |

(52) U.S. Cl.
CPC ... *B60T 8/17* (2013.01); *B60T 7/12* (2013.01); *B60T 7/22* (2013.01); *B60T 2201/022* (2013.01); *B60W 10/184* (2013.01); *B60W 30/0953* (2013.01); *B60W 30/0956* (2013.01); *B60W 2550/302* (2013.01); *B60W 2550/308* (2013.01)

(58) Field of Classification Search
USPC ................................ 701/70; 340/435; 342/70
See application file for complete search history.

(56) References Cited

U.S. PATENT DOCUMENTS

| 6,087,975 | A  * | 7/2000  | Sugimoto et al. ............... 342/70 |
|---|---|---|---|
| 6,566,999 | B2 * | 5/2003  | Iwasaki et al. ................ 340/435 |
| 7,493,202 | B2 * | 2/2009  | Demro et al. .................... 701/45 |
| 7,747,039 | B2 * | 6/2010  | Fujimoto ...................... 382/103 |
| 2008/0015743 | A1 * | 1/2008 | Haug ............................... 701/1 |
| 2008/0180528 | A1 * | 7/2008 | Saito ............................ 348/148 |
| 2009/0177359 | A1 * | 7/2009 | Ihara et al. ..................... 701/45 |
| 2011/0125372 | A1 * | 5/2011 | Ito .................................. 701/45 |
| 2011/0261168 | A1 * | 10/2011 | Shima et al. .................... 348/47 |

FOREIGN PATENT DOCUMENTS

JP   2007-223582 A   9/2007

* cited by examiner

*Primary Examiner* — Thomas G Black
*Assistant Examiner* — Tyler Paige
(74) *Attorney, Agent, or Firm* — McDermott Will & Emery LLP

(57) ABSTRACT

There is provided a driving support apparatus for a vehicle. When a height of a three-dimensional object extracted as a control subject is less than a set height, and as the height of the control subject becomes lower, a driving control unit increases the range of the braking control that is sequentially inhibited in the stepwise manner from the highest braking level to the lowest braking level.

13 Claims, 6 Drawing Sheets

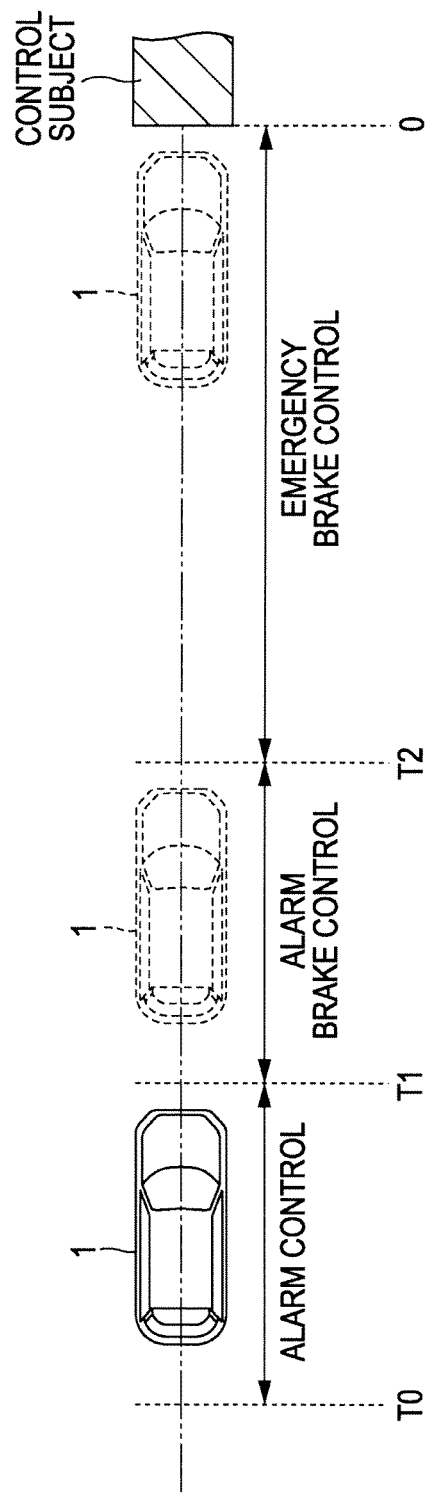

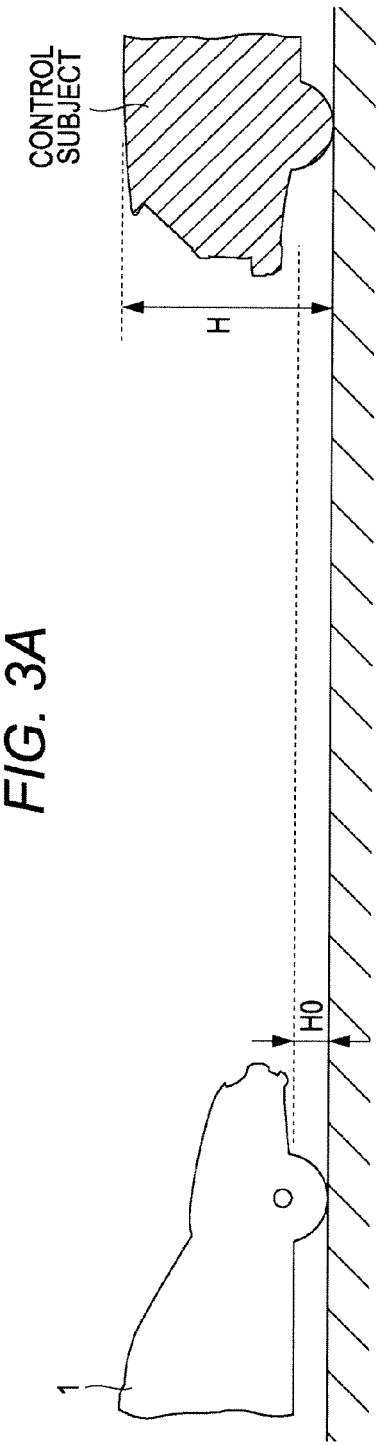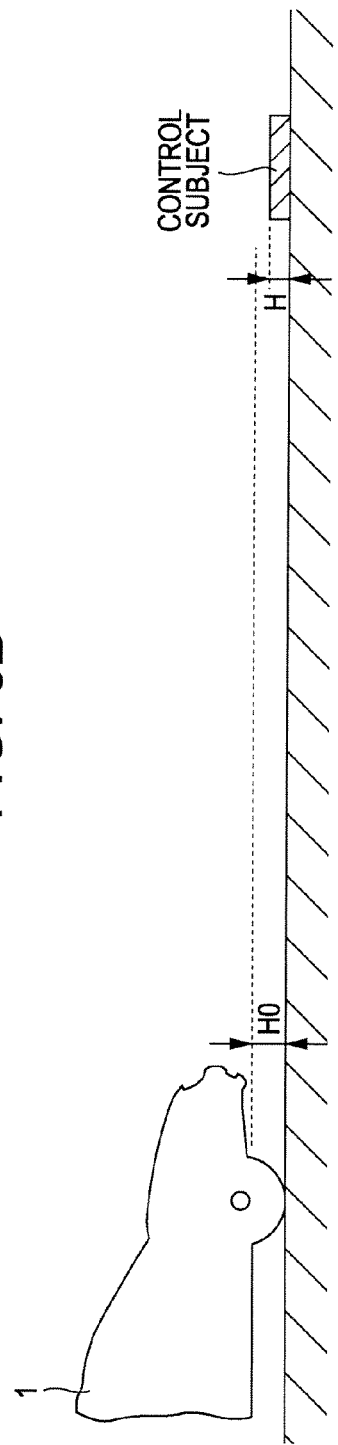

DRIVING SUPPORT APPARATUS FOR VEHICLE

CROSS-REFERENCE TO RELATED APPLICATIONS

The present application claims priority from Japanese Patent Application No. 2012-077036 filed on Mar. 29, 2012, the entire contents of which are hereby incorporated by reference.

BACKGROUND OF THE INVENTION

1. Field of the Invention

The present invention relates to a driving support apparatus for a vehicle, the driving support apparatus making a braking control for avoiding collision against a control subject, such as a vehicle ahead, when the vehicle determines that the possibility of collision of the vehicle against the control subject is high.

2. Description of the Related Art

A large number of driving support apparatuses for vehicles performing various vehicle controls has conventionally been proposed. The driving support apparatus of this type recognizes a driving environment in front of the vehicle by a camera or a laser radar device mounted to the vehicle, extracts an obstacle or a three-dimensional object such as a vehicle ahead from the driving environment data as a control subject, and performs various vehicle controls based upon a relative relationship between the extracted control subject and the vehicle.

As the vehicle control in the driving support apparatus of this type, there has been proposed a technique of setting a collision avoidance limit based upon a relative speed between the vehicle and the control subject, and making a braking control by using an automatic brake when the relative distance between the vehicle and the control subject becomes not more than the collision avoidance limit, whereby damage upon the collision against the control subject can be reduced. For example, Japanese Unexamined Patent Application Publication No. 2007-223582 describes a technique of setting an enlarged braking region closer to the vehicle than an actual braking region specified by the collision avoidance limit, and making a preliminary braking control by using the automatic brake even before the vehicle goes into the actual braking region.

In the execution of the braking control described above, a three-dimensional object having a height not less than a set value from a road surface is generally selected as a control subject. Therefore, even if a falling three-dimensional object whose size from the road surface is small is present on the road in front of the vehicle, this object is not extracted as the control subject, and the braking control for this object is not performed.

However, when a three-dimensional object such as a falling object is present on the road in front of the vehicle, a driver generally decelerates the vehicle to pay attention to the object, and it is desirable to make some braking control for the object of this type in order to allow the behavior of the vehicle to conform to the driver's feeling.

On the other hand, when the braking control equivalent to the braking control for the vehicle ahead is made for an object whose size from the road surface is small, excessive braking force might be applied against the driver's intention. Accordingly, the control might be unnatural, in fact.

BRIEF SUMMARY OF THE INVENTION

The present invention is accomplished in view of the above-mentioned circumstance, and aims to provide a driving support apparatus for a vehicle that can make a reasonable braking control, when even a three-dimensional object whose size from a road surface is small, such as a falling object on a road, is included in a control subject.

A driving support apparatus for a vehicle according to an aspect of the present invention includes: a driving environment recognition unit for recognizing a driving environment in front of the vehicle to detect three-dimensional object information; a control subject extracting unit for extracting a control subject from three-dimensional objects present in front of the vehicle based upon a condition set beforehand; a braking control unit for making plural braking controls, each having a different braking level, in a stepwise manner according to need based upon a relative relationship between the vehicle and the control subject; and an inhibiting unit for inhibiting the execution of the braking controls sequentially in the order of the braking level from the highest one, when the height of the three-dimensional object extracted as the control subject is less than a set height, wherein the inhibiting unit inhibits such that, the lower the three-dimensional object is, the more braking controls are inhibited.

BRIEF DESCRIPTION OF THE SEVERAL VIEWS OF THE DRAWINGS

FIG. 2 is an explanatory view illustrating a control timing set between the vehicle and a control subject in each braking control;

FIGS. 3A and 3B are explanatory views illustrating a relationship between the control subject and a set height;

DETAILED DESCRIPTION OF THE INVENTION

Figure 4:
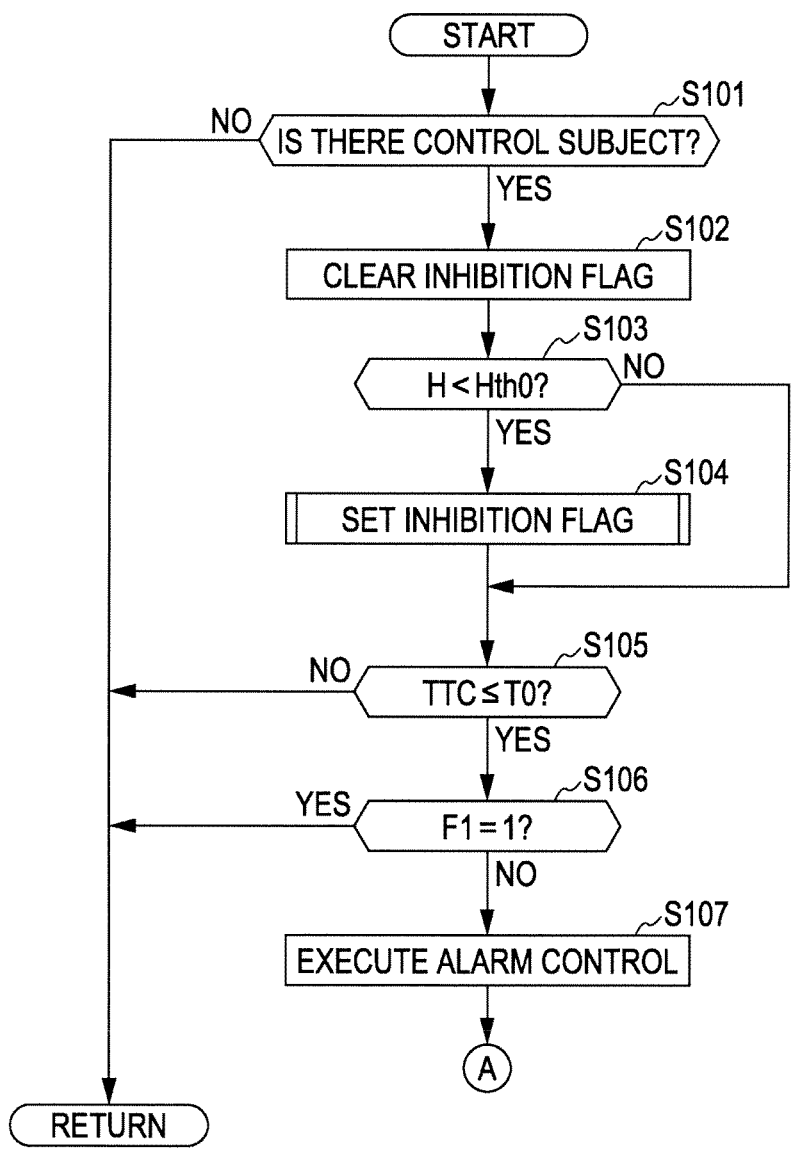
FIG. 4 is a flowchart (1) illustrating a braking control routine.
Figure 5:
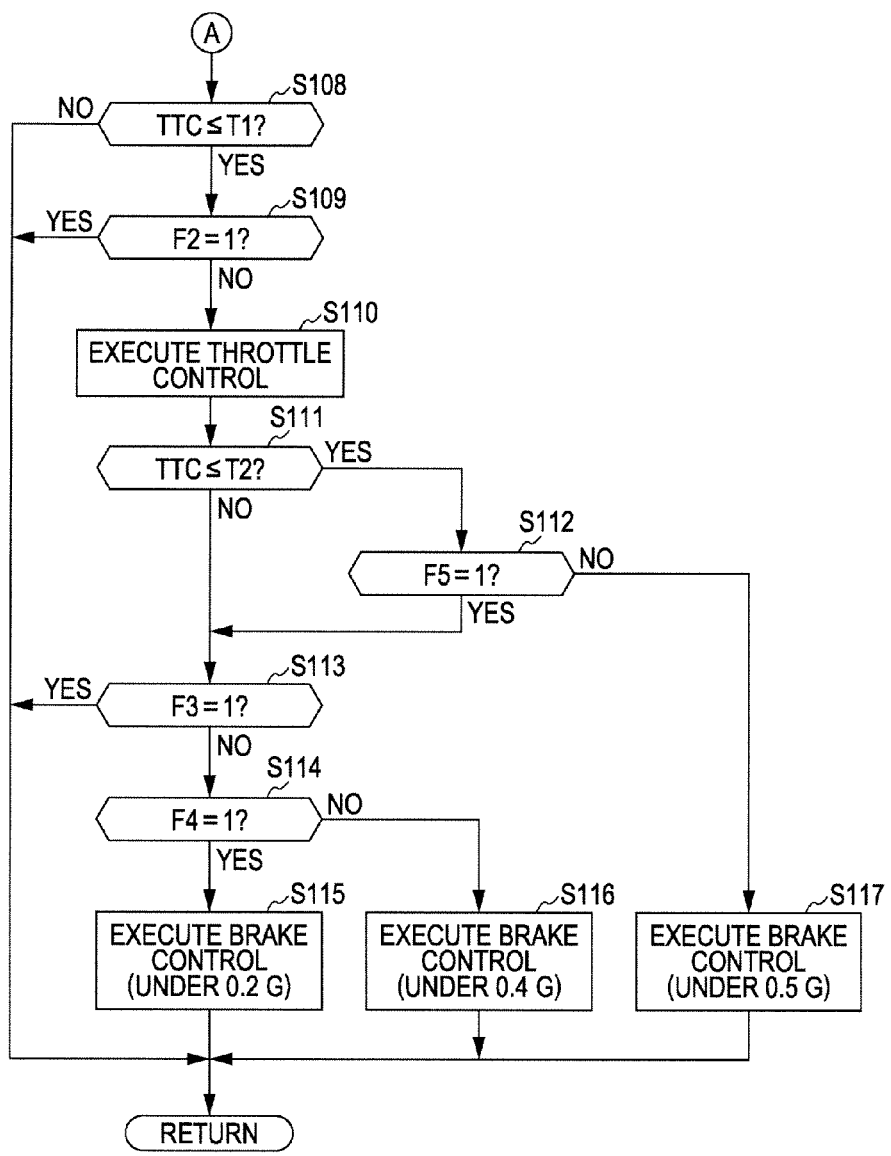
FIG. 5 is a flowchart (2) illustrating the braking control routine.
Figure 6:
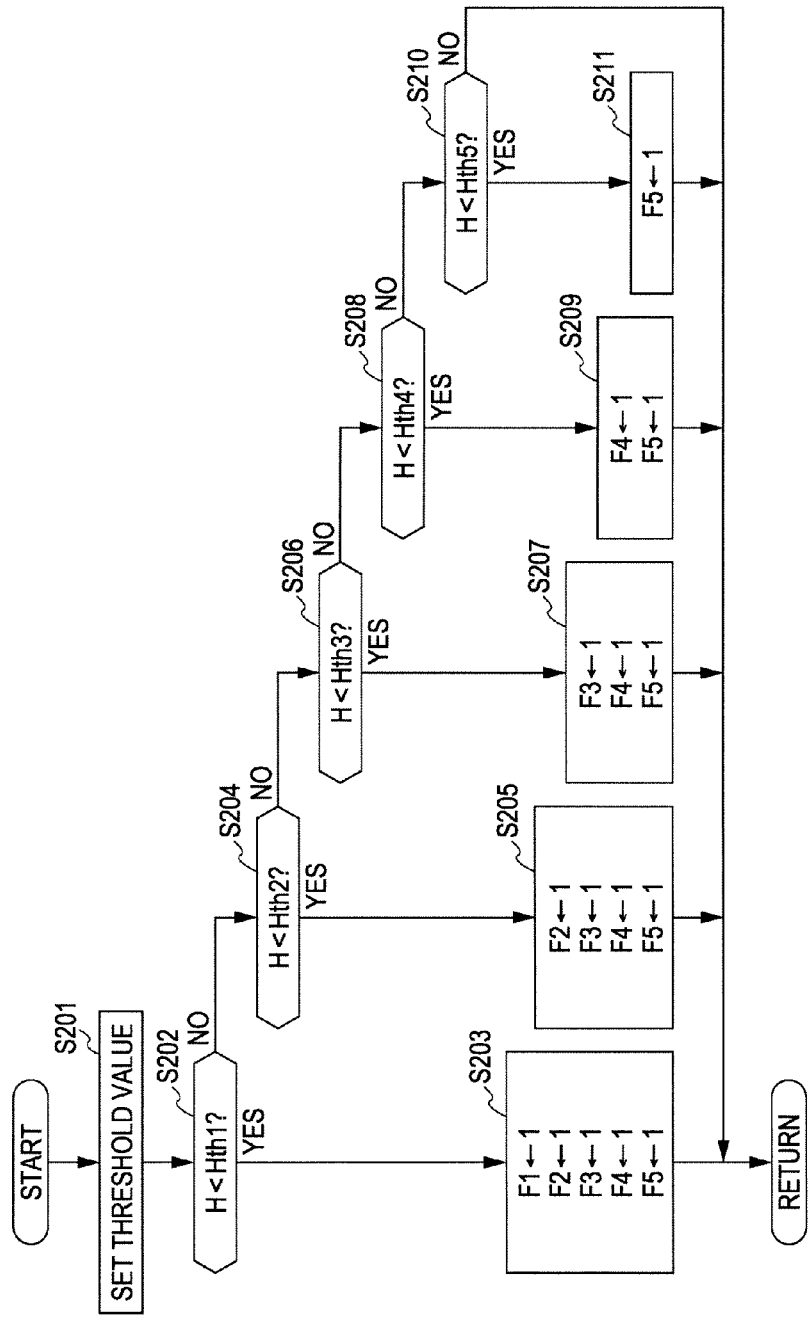
FIG. 6 is a flowchart illustrating an inhibition flag setting sub-routine.

An embodiment of the present invention will be described below with reference to the drawings. The drawings relate to an embodiment of the present invention, in which FIG. 1 is a diagram schematically illustrating a configuration of a driving support apparatus mounted on a vehicle, FIG. 2 is an explanatory view illustrating a control timing set between the vehicle and a control subject in each braking control, FIG. 3 is an explanatory view illustrating a relationship between the control subject and a set height, FIGS. 4 and 5 are flowcharts illustrating a braking control routine, and FIG. 6 is a flowchart illustrating an inhibition flag setting sub-routine.

Figure 1:
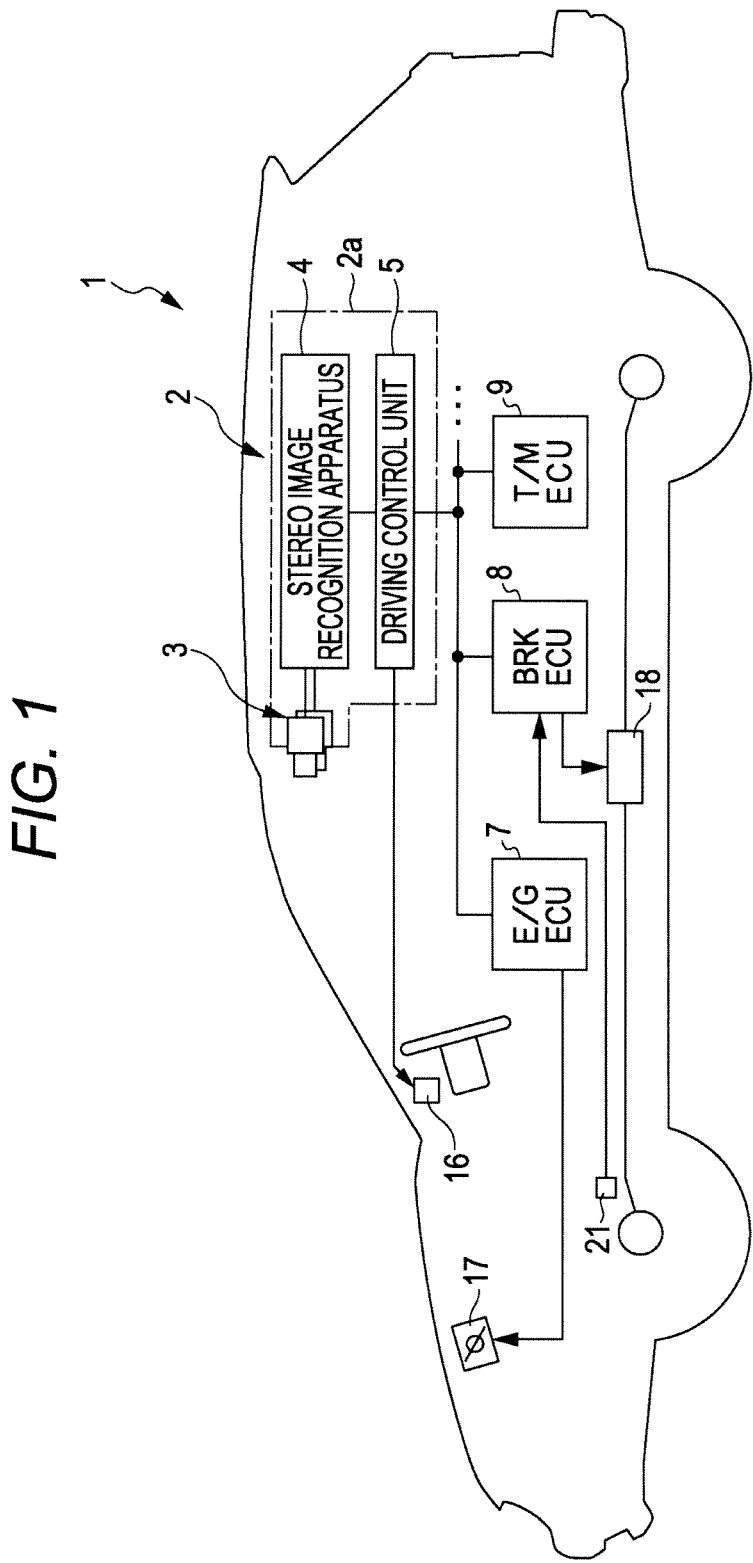
FIG. 1 is a diagram schematically illustrating a driving support apparatus mounted to a vehicle.

In FIG. 1, a vehicle 1 (the vehicle) such as an automobile is provided with a driving support apparatus 2 having a collision avoidance control function (pre-crash brake control function) as a driving control function.

A main part of the driving support apparatus 2 includes a stereo assembly 2a having, for example, a stereo camera 3, a stereo image recognition apparatus 4, and a driving control unit 5, these being integrally formed. Various vehicle-mounted control units such as an engine control unit (E/G_ECU) 7, a brake control unit (BRK_ECU) 8, and a transmission control unit (T/M_ECU) 9 are connected to the driving control unit 5 in the stereo camera assembly 2a so as to communicate with each other.

The stereo camera 3 includes a set of CCD cameras using solid state imaging devices such as charge-coupled devices (CCDs), for example, as a stereo optical system. The right and left CCD cameras are attached on front portions of a ceiling of a passenger compartment with a predetermined distance therebetween, capture images of external subjects in stereo from different points of view, and outputs the captured image information to the stereo image recognition apparatus 4.

The image information from the stereo camera 3, and the speed V of the vehicle 1 from the T/M_ECU 9 are input to the stereo image recognition apparatus 4. The stereo image recognition apparatus 4 recognizes front information, such as data of a three-dimensional object or white-line data, in front of the vehicle 1 based upon the image information from the stereo camera 3, and estimates a road on which the vehicle 1 runs based upon the recognized information. The stereo image recognition apparatus 4 also detects a vehicle ahead on the road on which the vehicle 1 runs, based upon the recognized data of the three-dimensional object.

The stereo image recognition apparatus 4 processes the image from the stereo camera 3 as described below, for example. Firstly, the stereo image recognition apparatus 4 generates distance information from a pair of stereoscopic images formed by capturing an environment in the traveling direction of the vehicle 1 by the stereo camera 3. The distance information is generated by a deviation amount between corresponding positions according to a principle of triangulation. The stereo image recognition apparatus 4 performs a known grouping process to the distance information, and compares the distance information to which the grouping process is performed to data of three-dimensional road shape or data of three-dimensional object, which are set beforehand, thereby extracting data of white line, data of sidewall such as a guard rail or a curb present along a road, and data of three-dimensional object such as a vehicle. The stereo image recognition apparatus 4 also estimates a road on which the vehicle 1 runs based upon the data of the white line or the data of the sidewall, and extracts (detects) the three-dimensional object that is present on the road on which the vehicle 1 runs, and that moves with a predetermined speed (e.g., 0 Km/h or more) in the direction almost same as the moving direction of the vehicle 1 as a vehicle ahead. When detecting the vehicle ahead, the stereo image recognition apparatus 4 calculates, as information of the vehicle ahead, a distance ID (=inter-vehicle distance) between the vehicle 1 and the vehicle ahead, the speed Vf of the vehicle ahead (=(ratio of change in inter-vehicle distance D)+(speed V of the vehicle 1), and acceleration of the vehicle ahead (=a differential value of the speed Vf of the vehicle ahead). The vehicle ahead whose speed Vf is not more than a predetermined value (e.g., 4 Km/h or less), and which is not accelerated in vehicles ahead, is recognized as a vehicle ahead that is generally stopped.

The driving control unit 5 receives, for example, various recognition information involved with the front environment at the outside of the vehicle 1 from the stereo image recognition apparatus 4, and the speed V of the vehicle 1 from the T/M_ECU 9.

When the three-dimensional objects recognized by the stereo image recognition apparatus 4 are present on the road on which the vehicle 1 runs, the driving control unit 5 extracts the closest one of the three-dimensional objects as a control subject. Not only the above-mentioned vehicle ahead but also various three-dimensional objects stopping on the road on which the vehicle 1 runs are included in the control subject to be extracted. In the present embodiment, a three-dimensional object, which has a height less than a minimum road clearance of the vehicle 1, and whose height component from the road surface is detected, is included in the control subject to be extracted. When extracting the control subject, the driving control unit 5 calculates a time (also referred to as a time-to-collision) TTC until the vehicle 1 collides against the control subject (TTC=relative distance/relative speed), based upon the relative distance and the relative speed between the vehicle 1 and the control subject, for example. When the driving control unit 5 determines that the vehicle 1 might collide against the control subject based upon the time-to-collision TTC, it makes a braking control.

In the present embodiment, the braking control means a control in a broad sense involved with the braking of the vehicle 1, for example. Specifically, the driving control unit 5 in the present embodiment has three types of the braking controls, each having a different braking level. They are an alarm control, an alarm brake control, and an emergency brake control.

The alarm control has the lowest braking level, and it is executed first when the driving control unit 5 determines that there is a possibility of the collision against the control subject. This control is executed when the TTC is equal to or shorter than a set threshold value T0 (e.g., T0=2.0 seconds: see FIG. 2). In the alarm control, a driver's attention is drawn to the control subject by an alarm from an alarm device 16 or by a display on a meter. This control urges the driver to carry out the collision avoidance operation represented by the brake operation (braking operation).

The alarm brake control is executed when the appropriate collision avoidance operation (steering operation or brake operation by the driver) by the driver is not executed in response to the alarm control. This control is executed when the TTC becomes equal to or shorter than a set threshold value T1 (e.g., T1=1.5 seconds: see FIG. 2). In the alarm brake control, an engine brake control through a control for a throttle valve 17 is executed, and the automatic brake is lightly applied (e.g., the automatic brake with braking force of 0.4 G or lower is applied) by the control of the outputted hydraulic pressure from a brake booster 18 through the BRK_ECU 8. The braking control described above is executed in order to draw again the driver's attention. In the alarm brake control, the braking level is classified more. For example, the driving control unit 5 has a first alarm brake control for reducing the speed of the vehicle 1 only by the throttle control, a second alarm control that uses the automatic brake with the deceleration under 2G together with the first alarm brake control, and a third alarm brake control that uses the automatic brake with the deceleration under 0.4 G together with the first alarm brake control.

The emergency brake control has the highest brake level. It is executed when the driver does not carry out the appropriate collision avoidance operation even to the alarm brake control, and executed when the TTC becomes equal to or shorter than a set threshold value T2 (e.g., T2=1.0 second: see FIG. 2). In the emergency brake control, the automatic brake is strongly applied (e.g., the automatic brake with braking force of 0.5 G or lower is applied) by the control of the outputted hydraulic pressure from the brake booster 18 through the BRK_ECU 8, in order to stop the vehicle 1 just before the control subject. The emergency brake control substantially includes the above-mentioned alarm brake control. Therefore, the deceleration by the throttle control is also used in the emergency brake control. When the vehicle 1 stops by the execution of the emergency brake control, the driving unit 5 operates an electric parking brake, not illustrated, to keep the vehicle 1 in stopped condition.

When the braking control is sequentially carried out in a stepwise manner in the order of the braking level from the lowest one according to need as described above, the driving control unit 5 sequentially inhibits the execution of the braking control in a stepwise manner in the order of the braking level from the highest one, when a height of the three-dimensional object is extracted as the control subject less than a set height (threshold value Hth0). Specifically, the driving control unit 5 inhibits the execution such that, the lower the three-dimensional object is, the more braking controls are inhibited. As illustrated in FIGS. 3A and 3B, the set height (threshold value Hth0) is set to be lower than the minimum road clearance of the vehicle 1. More specifically, the set height is set to be a value obtained by subtracting a predetermined margin from the minimum road clearance of the vehicle 1. When the height H of the control subject is less than the set height Hth0, and as the height H of the control subject becomes lower, the driving control unit 5 increases the range of the braking control that is sequentially inhibited in the stepwise manner from the highest braking level to the lowest braking level, such as "the inhibition of the execution of only the emergency brake control", "the inhibition of the execution of the emergency brake control, and the execution of the third alarm brake control", "the inhibition of the execution of the emergency brake control, the execution of the third alarm brake control, and the execution of the second alarm brake control", "the inhibition of the execution of the emergency brake control, the execution of the third alarm brake control, the execution of the second alarm brake control, and the execution of the first alarm brake control", and "the inhibition of the execution of the emergency brake control, the execution of the third alarm brake control, the execution of the second alarm brake control, the execution of the first alarm brake control, and the execution of the alarm control".

As described above, the stereo camera 3 and the stereo image recognition apparatus 4 in the present embodiment realize a function as a driving environment recognition unit, and the driving control unit 5 realizes functions of a control subject extracting unit, a braking control unit, and an inhibiting unit.

The braking control executed by the driving control unit 5 will be described with reference to flowcharts of a braking control routine in FIGS. 4 and 5. This routine is repeatedly executed at an interval of a preset time. When the routine is started, the driving control unit 5 firstly checks whether a three-dimensional object, which is to become the control subject for the braking control, is currently present or not in front of the vehicle 1 in step S101.

When determining that the control subject is not extracted in step S101, the driving control unit 5 exits the routine without executing any process.

When determining that the control subject is extracted in step S101, the driving control unit 5 proceeds to step S102 to clear all of inhibition flags F1 to F5 (described later), which are used to inhibit the execution of the braking control in each braking level, to "0".

When proceeding to step S103 from step S102, the driving control unit 5 checks whether the height H of the three-dimensional object currently extracted as the control subject is less than the above-mentioned set threshold value Hth0 or not.

When determining that the height H of the control subject is not less than the set threshold value Hth0 in step S103, the driving control unit 5 jumps to step S105.

On the other hand, when determining that the height H of the control subject is less than the set threshold value Hth0 in step S103, the driving control unit 5 proceeds to step S104 to set the inhibition flags F1 to F5.

The inhibition flags F1 to F5 are set according to a flowchart of an inhibition flag setting sub-routine illustrated in FIG. 6. After the sub-routine is started, the driving control unit 5 firstly sets first to fifth threshold values Hth1 to Hth5 for setting the respective inhibition flags in step S201. The first to fifth threshold values Hth1 to Hth5 are set based upon the minimum road clearance of the vehicle 1. Specifically, the driving control unit 5 sets a height of 50% of the minimum road clearance of the vehicle 1 as a reference value of the first threshold value Hth1, a height of 60% of the minimum road clearance of the vehicle 1 as a reference value of the second threshold value Hth2, a height of 70% of the minimum road clearance of the vehicle 1 as a reference value of the third threshold value Hth3, a height of 80% of the minimum road clearance of the vehicle 1 as a reference value of the fourth threshold value Hth4, and a height of 90% of the minimum road clearance of the vehicle 1 as a reference value of the fifth threshold value Hth5, for example. The driving control unit 5 calculates the threshold values Hth1 to Hth5 by multiplying each reference value by a gain G according to the speed V of the vehicle 1. The gain G in this case is set such that, the more the speed V of the vehicle 1 increases, the smaller the gain G is set. For example, in the case of V<50 [Km/h], G=1.0 is established; in the case of 50 [Km/h]≤V<70 [Km/h], G=0.9 is established; in the case of 70 [Km/h]≤V≤90 [Km/h], G=0.8 is established; and in the case of 90 [Km/h]≤V, G=0.7 is established. It is obvious that the reference values may be set as the first to fifth threshold value Hth1 to Hth5 without the multiplication of the gain G.

When proceeding to step S202 from step S201, the driving control unit 5 checks whether the height H of the control subject is less than the first threshold value H1 or not.

When determining that the height H of the control subject is less than the first threshold value Hth1 in step S202, the driving control unit 5 proceeds to step S203 to set all of the first to fifth inhibition flags F1 to F5 to "1", and then, exits the sub-routine.

On the other hand, when determining that the height H of the control subject is not less than the first threshold value Hth1 in step S202, the driving control unit 5 proceeds to step S204 to check whether the height H of the control subject is less than the second threshold value Hth2 or not.

When determining that the height H of the control subject is less than the second threshold value Hth2 in step S204, the driving control unit 5 proceeds to step S205 to set the second to fifth inhibition flags F2 to F5 to "1", and then, exits the sub-routine.

On the other hand, when determining that the height H of the control subject is not less than the second threshold value Hth2 in step S204, the driving control unit 5 proceeds to step S206 to check whether the height H of the control subject is less than the third threshold value Hth3 or not.

When determining that the height H of the control subject is less than the third threshold value Hth3 in step S206, the driving control unit 5 proceeds to step S207 to set the third to fifth inhibition flags F3 to F5 to "1", and then, exits the sub-routine.

On the other hand, when determining that the height H of the control subject is not less than the third threshold value Hth3 in step S206, the driving control unit 5 proceeds to step S208 to check whether the height H of the control subject is less than the fourth threshold value Hth4 or not.

When determining that the height H of the control subject is less than the fourth threshold value Hth4 in step S208, the driving control unit 5 proceeds to step S209 to set the fourth and fifth inhibition flags F4 and F5 to "1", and then, exits the sub-routine.

On the other hand, when determining that the height H of the control subject is not less than the fourth threshold value Hth4 in step S208, the driving control unit 5 proceeds to step S210 to check whether the height H of the control subject is less than the fifth threshold value Hth5 or not.

When determining that the height H of the control subject is less than the fifth threshold value Hth5 in step S210, the driving control unit 5 proceeds to step S211 to set the fifth inhibition flag F5 to "1", and then, exits the sub-routine.

When determining that the height H of the control subject is not less than the fifth threshold value Hth5 in step S210, the driving control unit 5 exits the sub-routine.

When proceeding to step S105 from step S103 or from step S104 in the main routine in FIG. 4, the driving control unit 5 checks whether the time-to-collision TTC is equal to or shorter than the set threshold time T0 (e.g., T0=2.0 seconds) or not.

When determining that the time-to-collision TTC is longer than the set threshold time T0 in step S105, the driving control unit 5 exits the routine without executing any process.

On the other hand, when determining that the time-to-collision TTC is equal to or shorter than the set time T0 in step S105, the driving control unit 5 proceeds to step S106 to check whether the first inhibition flag F1 is set to "1" or not.

When determining that the first inhibition flag F1 is set to "1" in step S106, the driving control unit 5 exits the routine without executing any process. Specifically, as apparent from the sub-routine described above, the case where the first inhibition flag F1 is set to "1" means that the height H of the control subject is less than the first height Hth1. In this case, the second to fifth inhibition flags F2 to F5 are also set to "1". Therefore, even if the time-to-collision TTC satisfies a predetermined execution condition, the driving control unit 5 exits the routine without executing any braking controls.

On the other hand, when determining that the first inhibition flag F1 is not set to "1" in step S106 (i.e., when determining that the first inhibition flag F1 is cleared to "0"), the driving control unit 5 proceeds to step S107 to execute the alarm control.

When proceeding to step S108 from step S107, the driving control unit 5 checks whether the time-to-collision TTC is equal to or shorter than the set threshold time T1 (e.g., T1=1.5 seconds).

When determining that the time-to-collision TTC is longer than the set time T1 in step S108, the driving control unit 5 exits the routine.

On the other hand, when determining that the time-to-collision TTC is equal to or shorter than the set time T1 in step S108, the driving control unit 5 proceeds to step S109 to check whether the second inhibition flag F2 is set to "1" or not.

When determining that the second inhibition flag F2 is set to "1" in step S109, the driving control unit 5 exits the routine. Specifically, as apparent from the sub-routine described above, the case where the second inhibition flag F2 is set to "1" means that the height H of the control subject is less than at least the second threshold value Hth2. In this case, at least the third to fifth inhibition flags F3 to F5 are also set to "1". Therefore, even if the time-to-collision TTC satisfies the predetermined execution condition, the driving control unit 5 exits the routine without executing the first to third alarm brake controls and the emergency brake control.

On the other hand, when determining that the second inhibition flag F2 is not set to "1" in step S109 (i.e., when determining that the second inhibition flag F2 is cleared to "0"), the driving control unit 5 proceeds to step S110 to execute the throttle control (i.e., to execute at least the alarm control and the first alarm brake control).

When proceeding to step S111 from step S110, the driving control unit 5 checks whether the time-to-collision TTC is equal to or shorter than the set threshold time T2 (e.g., T2=1.0 second).

When determining that the time-to-collision TTC is equal to or shorter than the set time T2 in step S111, the driving control unit 5 proceeds to step S112 to check whether the fifth inhibition flag F5 is set to "1" or not.

When determining that the fifth inhibition flag F5 is set to "1" in step S112, the driving control unit 5 proceeds to step S113. When determining that the fifth inhibition flag F5 is not set to "1" (i.e., when the fifth inhibition flag F5 is cleared to "0"), the driving control unit 5 proceeds to step S117.

When proceeding to step S113 from step S111 or step S112, the driving control unit 5 checks whether the third inhibition flag F3 is set to "1" or not.

When determining that the third inhibition flag F3 is set to "1" in step S113, the driving control unit 5 exits the routine. Specifically, as apparent from the sub-routine described above, the case where the third inhibition flag F3 is set to "1" means that the height H of the control subject is less than at least the third threshold value Hth3. In this case, at least the fourth and fifth inhibition flags F4 and F5 are also set to "1". Therefore, even if the time-to-collision TTC satisfies the predetermined execution condition, the driving control unit 5 exits the routine without executing the second and third alarm brake controls and the emergency brake control.

On the other hand, when determining that the third inhibition flag F3 is not set to "1" in step S113 (i.e., when determining that the third inhibition flag F3 is cleared to "0"), the driving control unit 5 proceeds to step S114 to check whether the fourth inhibition flag F4 is set to "1" or not.

When determining that the fourth inhibition flag F4 is set to "1" in step S114, the driving control unit 5 proceeds to step S115 to execute the brake control (second alarm brake control) with the deceleration under 0.2 G (i.e., to execute the alarm control and the first and second alarm brake controls), and then, exits the routine.

On the other hand, when determining that the fourth inhibition flag F4 is not set to "1" in step S114 (i.e., when determining that the fourth inhibition flag F4 is cleared to "0"), the driving control unit 5 proceeds to step S116 to execute the brake control (the third alarm brake control) with the deceleration under 0.4 G (i.e., to execute the alarm control and the first to third alarm brake controls), and then, exits the routine.

When proceeding to step S117 from step S112, the driving control unit 5 executes the brake control (the emergency brake control) with the deceleration under 0.5 G (i.e., executes the alarm control, the first to third alarm brake controls, and the emergency brake control), and then, exits the routine.

According to the embodiment described above, when the height H of the control subject is less than the set height Hth0, and as the height H of the control subject becomes lower, the driving control unit 5 increases the range of the braking control that is sequentially inhibited in the stepwise manner from the highest braking level to the lowest braking level, such as "the inhibition of the execution of only the emergency brake control", "the inhibition of the execution of the emergency brake control, and the execution of the third alarm brake control", "the inhibition of the execution of the emergency brake control, the execution of the third alarm brake control, and the execution of the second alarm brake control", "the inhibition of the execution of the emergency brake control, the execution of the third alarm brake control, the execution of the second alarm brake control, and the execution of the first alarm brake control", and "the inhibition of the execution of the emergency brake control, the execution of the third alarm brake control, the execution of the second alarm brake control, the execution of the first alarm brake control, and the execution of the alarm control". Accordingly, the driving support apparatus for a vehicle according to the present invention can make a reasonable braking control, when even a three-dimensional object whose size from a road surface is small, such as a falling object on a road, is included in a control subject.

Specifically, when a three-dimensional object, such as a falling object on a road, with a height of less than the set height Hth0 is present on the road in front of the vehicle 1, the driving control unit 5 controls such that, the easier the driver determines that the three-dimensional object has a height causing any trouble even if the vehicle 1 runs over the three-dimensional object, the more braking controls even with the low braking level are to be inhibited, whereby unnecessary braking controls are inhibited and the reasonable braking control can be realized.

In this case, the set height Hth0 is set to be lower than the minimum road clearance of the vehicle 1. Accordingly, the control conforming more to the driver's feeling can be realized.

The threshold values Hth1 to Hth5 for determining the inhibition of the respective braking controls are set such that, the more the speed V of the vehicle 1 increases, the lower the threshold value becomes. Therefore, the number of the braking controls that can be inhibited increases, as the speed V of the vehicle 1 increases. Accordingly, the control conforming more to the driver's feeling can be realized.

The present invention is not limited to the embodiment described above, and various variations and modifications are possible without departing from the technical scope of the present invention. For example, it is obvious that the manner of the braking controls is not limited to those described above.

What is claimed is:

1. A driving support apparatus for a vehicle comprising:
   a driving environment recognition unit for recognizing a driving environment in front of the vehicle to detect three-dimensional object information;
   a control subject extracting unit for extracting a control subject from three-dimensional objects present in front of the vehicle based upon a condition set beforehand;
   a braking control unit for executing plural braking controls, each having a different braking level, in a stepwise manner according to need based upon a relative relationship between the vehicle and the control subject; and
   an inhibiting unit for inhibiting execution of the braking controls sequentially in the order of the braking level from the highest one, when the height of the three-dimensional object extracted as the control subject is less than a set height, wherein:
   when the height of the three-dimensional object extracted as the control subject is less than the set height, the inhibiting unit inhibits the execution of the braking controls such that, the lower the height of the three-dimensional object is, the more braking controls to be executed in a stepwise manner in a stepwise manner are inhibited, and
   when the height of the three-dimensional object extracted as the control subject is equal to or higher than the set height, the braking control unit executes one or more of the braking controls, when a time-to-collision is equal to or less than a threshold time.

2. The driving support apparatus for a vehicle according to claim 1, wherein the set height is set to be lower than a minimum road clearance of the vehicle.

3. The driving support apparatus for a vehicle according to claim 1, wherein the inhibiting unit inhibits such that, the more the speed of the vehicle increases, the more braking controls are inhibited.

4. The driving support apparatus for a vehicle according to claim 2, wherein the inhibiting unit inhibits such that, the more the speed of the vehicle increases, the more braking controls are inhibited.

5. A driving support apparatus for a vehicle comprising:
   a detector configured to detect a height of a three-dimensional object in front of the vehicle;
   a braking controller configured to execute one or more of braking controls in a stepwise manner based upon a relative relationship between the vehicle and the three-dimensional object, each of the braking controls having a different braking level; and
   a driving controller configured to inhibit execution of one or more of the braking controls sequentially in the order of the braking level from the strongest one, when the height of the three-dimensional object is less than a threshold height, wherein:
   when the height of the three-dimensional object is less than the threshold height, the driving controller inhibits the execution of the braking controls such that the lower the height of the three-dimensional object is, the more number of the braking controls to be executed in a stepwise manner is inhibited, and
   when the height of the three-dimensional object is equal to or higher than the threshold height, the braking controller executes one or more of the braking controls, when a time-to-collision is equal to or less than a threshold time.

6. The driving support apparatus for a vehicle according to claim 5, wherein the threshold height is set to be lower than a minimum road clearance of the vehicle.

7. The driving support apparatus for a vehicle according to claim 5, wherein the driving controller inhibits the execution of the braking controls such that the higher a speed of the vehicle is, the more number of the braking controls is inhibited.

8. The driving support apparatus for a vehicle according to claim 5, wherein the braking controls includes, from the strongest one, an emergency brake control, an alarm brake control and an alarm control.

9. The driving support apparatus for a vehicle according to claim 1, wherein the braking controls includes, from the strongest one, an emergency brake control, an alarm brake control and an alarm control.

10. A driving support apparatus for a vehicle comprising:
   a driving environment recognition unit for recognizing a driving environment in front of the vehicle to detect three-dimensional object information;
   a control subject extracting unit for extracting a control subject from three-dimensional objects present in front of the vehicle based upon a condition set beforehand;
   a braking control unit for executing plural braking controls, each having a different braking level, in a stepwise manner according to need based upon a relative relationship between the vehicle and the control subject; and
   an inhibiting unit for inhibiting execution of the braking controls sequentially in the order of the braking level from the highest one, when the height of the three-dimensional object extracted as the control subject is less than a set height, wherein:
   the inhibiting unit inhibits the execution of the braking controls such that, the lower the height of the three-dimensional object is, the more braking controls are inhibited, and the inhibiting unit inhibits such that, the more the speed of the vehicle increases, the more braking controls are inhibited.

11. The driving support apparatus for a vehicle according to claim 10, wherein the set height is set to be lower than a minimum road clearance of the vehicle.

12. The driving support apparatus for a vehicle according to claim 10, wherein the braking control unit executes one or more of the braking controls which are not inhibited by the inhibiting unit when a time-to-collision is equal to or less than a threshold time.

13. The driving support apparatus for a vehicle according to claim 10, wherein the braking controls includes, from the strongest one, an emergency brake control, an alarm brake control and an alarm control.

* * * * *